United States Patent
Ahani et al.

(10) Patent No.: US 12,192,408 B1
(45) Date of Patent: *Jan. 7, 2025

(54) SYSTEMS AND METHODS FOR ELECTRONIC REQUEST ROUTING AND DISTRIBUTION

(71) Applicant: MASSACHUSETTS MUTUAL LIFE INSURANCE COMPANY, Springfield, MA (US)

(72) Inventors: Asieh Ahani, Springfield, MA (US); Tara Zayac, Springfield, MA (US); Michael Tracy, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,216

(22) Filed: Aug. 11, 2023

Related U.S. Application Data

(63) Continuation of application No. 17/937,663, filed on Oct. 3, 2022, now Pat. No. 11,729,317, which is a
(Continued)

(51) Int. Cl.
*H04M 3/523* (2006.01)
*G06N 5/01* (2023.01)
(Continued)

(52) U.S. Cl.
CPC ............. *H04M 3/523* (2013.01); *G06N 5/01* (2023.01); *G06N 5/04* (2013.01); *G06N 20/20* (2019.01); *H04M 3/5191* (2013.01)

(58) Field of Classification Search
CPC .......... G06N 5/003; G06N 5/04; G06N 20/20; H04M 3/51; H04M 3/5192; H04M 3/523
(Continued)

(56) References Cited

U.S. PATENT DOCUMENTS

| | | |
|---|---|---|
| 11,463,585 B1 | 10/2022 | Ahani et al. |
| 11,729,317 B1 * | 8/2023 | Ahani ................... G06N 20/00 379/265.09 |

(Continued)

OTHER PUBLICATIONS

Non-Final Office Action for U.S. Appl. No. 17/020,365 dated Feb. 9, 2022 (9 pages).
(Continued)

*Primary Examiner* — Harry S Hong
(74) *Attorney, Agent, or Firm* — Foley & Lardner LLP

(57) ABSTRACT

Disclosed herein are embodiments of systems, methods, and products comprises an analytic server for electronic requests routing and distribution. The server receives a plurality of requests from a plurality of electronic user devices. Aiming to routing the plurality of requests to appropriate agents, the server trains an artificial intelligence model for each agent based on historical data. For each request, the server executes the artificial intelligence model to determine a score indicating the probability of the agent converting the request to a successful sale. The server determines an entropy value for each request based on the scores and order the requests into a queue based on the entropy values. The server also calculates a capacity for each agent based on historical agent data. For each request in the queue, the server routes the request to an agent based on at least one of the score and capacity of the agent.

20 Claims, 16 Drawing Sheets

Related U.S. Application Data continuation of application No. 17/020,365, filed on Sep. 14, 2020, now Pat. No. 11,463,585.

(60) Provisional application No. 62/899,528, filed on Sep. 12, 2019.

(51) Int. Cl.
*G06N 5/04* (2023.01)
*G06N 20/20* (2019.01)
*H04M 3/51* (2006.01)

(58) Field of Classification Search
USPC ............ 379/265.06–265.09, 266.01, 266.02
See application file for complete search history.

(56) References Cited

U.S. PATENT DOCUMENTS

| | | |
|---|---|---|
| 2015/0030151 A1 | 1/2015 | Bellini et al. |
| 2018/0150843 A1 | 5/2018 | Adjaoute |
| 2021/0264466 A1 | 8/2021 | Aggarwal et al. |
| 2021/0312452 A1 | 10/2021 | Allbright |

OTHER PUBLICATIONS

Notice of Allowance on U.S. Appl. No. 17/937,663 dated Mar. 24, 2023 (8 pages).
Notice of Allowance on U.S. Appl. No. 17/020,365 dated May 26, 2022 (5 pages).

* cited by examiner

| Model | Model | Standard Assignment |
|---|---|---|
| Random Forest | 64% | 13% |
| Bayesian Logistic Regression | 45% | 13% |

| Model | Model | Random Assignment |
|---|---|---|
| Random Forest | 64% | 10% |
| Bayesian Logistic Regression | 45% | 10% |

SYSTEMS AND METHODS FOR ELECTRONIC REQUEST ROUTING AND DISTRIBUTION

CROSS-REFERENCE TO RELATED APPLICATIONS

This application is a continuation application of U.S. patent application Ser. No. 17/937,663, filed Oct. 3, 2022, which is a continuation of U.S. patent application Ser. No. 17/020,365, filed, Sep. 14, 2020, which claims priority to U.S. Provisional Patent Application Ser. No. 62/899,528, filed Sep. 12, 2019, each of which is incorporated by reference in its entirety.

TECHNICAL FIELD

This application relates generally to methods and systems for electronic request routing and distribution.

BACKGROUND

As the processing power of computers allows for greater computer functionality and the Internet technology era allows for interconnectivity between computing systems, many existing software solutions receive a high volume of electronic requests. Managing such electronic requests in an accurate and effective way to route each electronic request to the right agent/advisor is difficult. Existing software solutions, utilizing conventional methods, have encountered a new set of technical challenges. First, existing and conventional software solutions may randomly route each electronic request, which has proven to be inadequate. For instance, existing software solutions fail to consider attributes associated with the users transmitting the electronic requests and attributes associated with the agent/employees to identify a best match. As a result, existing software solutions may route the electronic requests to agents who cannot provide the best service, which may lead to negative user experience and loss of profit.

Second, existing software solutions fail to consider the capacity of each agent. For instance, existing software solutions may route too many requests to an agent who has been proven to provide better services than other agents. This may overburden the agent and may negatively affect his or her performance. For example, one agent may receive a large number of electronic requests that is beyond the agent's capacity. The agent may be too overwhelmed to provide the best service for each request, while other agents may not have enough work. Therefore, existing software solutions fail to consider load balancing when distributing the high volume of electronic requests, which may create inefficiencies and waste of resources.

SUMMARY

For the aforementioned reasons, there is a need for an accurate and efficient computer-implemented system and method for routing and distributing electronic requests to agents. There is a further need for a computer-specific set of rules to efficiently and accurately select right agents when facing a high number of electronic requests.

Embodiments disclosed herein address the above challenges by providing accurate and efficient electronic requests routing and distribution. Specifically, an analytic server receives a plurality of requests. Aiming to route the plurality of requests to appropriate agents, the analytic server trains an artificial intelligence model for each agent based on historical data. For each request, the analytic server executes the artificial intelligence model to determine a score indicating the probability of the agent converting the request to a successful sale. The analytic server determines an entropy value for each request based on the scores and order the requests into a queue based on the entropy values. The analytic server sequentially processes the requests in the queue. The analytic server also calculates a capacity for each agent based on historical data. The analytic server routes each request in the queue to an agent based on at least one of the score and the capacity.

In an embodiment, a method comprises executing, by the server, using an electronic request attribute and a first user's attributes from an electronic request to match the first user with a second user, a set of artificial intelligence models to determine a score corresponding to each second user of a plurality of second users, each score being indicative of a probability of the second user satisfying the electronic request, each artificial intelligence model of the set of artificial intelligence models corresponding to historical data of each second user, and each artificial intelligence model configured to determine a relationship between a set of attributes of a second user and a set of attributes associated with the second user's existing customers whose electronic requests have been previously satisfied by the second user; calculating, by the server, an entropy value based on the scores of the plurality of second users, the entropy value corresponding to each score for each second user in relation to the electronic request; iteratively selecting, by the server, a target second user for each electronic request based on at least one of the score and a capacity associated with the target second user; sequentially assigning, by the server, the plurality of electronic requests to corresponding target second users in an order based on a queue arranged in accordance with each electronic request's entropy value; and transmitting, by the server in real time, each electronic request to a computing device associated with the target second user.

In another embodiment, a computer system comprises a server having computer-readable instructions on a non-transitory computer-readable medium that when executed by a processor: execute using an electronic request attribute and a first user's attributes from an electronic request to match the first user with a second user, a set of artificial intelligence models to determine a score corresponding to each second user of a plurality of second users, each score being indicative of a probability of the second user satisfying the electronic request, each artificial intelligence model of the set of artificial intelligence models corresponding to historical data of each second user, and each artificial intelligence model configured to determine a relationship between a set of attributes of a second user and a set of attributes associated with the second user's existing customers whose electronic requests have been previously satisfied by the second user; calculate an entropy value based on the scores of the plurality of second users, the entropy value corresponding to each score for each second user in relation to the electronic request; iteratively select a target second user for each electronic request based on at least one of the score and a capacity associated with the target second user; sequentially assign the plurality of electronic requests to corresponding target second users in an order based on a queue arranged in accordance with each electronic request's entropy value; and transmit in real time each electronic request to a computing device associated with the target second user.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 6A illustrates the model performance compared with historical assignment performance, according to an embodiment.

FIG. 6B illustrates the model performance compared with random assignment performance, according to an embodiment.

FIG. 7A illustrates an example of a graphical user interface for agent list, according to an embodiment.

DETAILED DESCRIPTION

Figure 1:
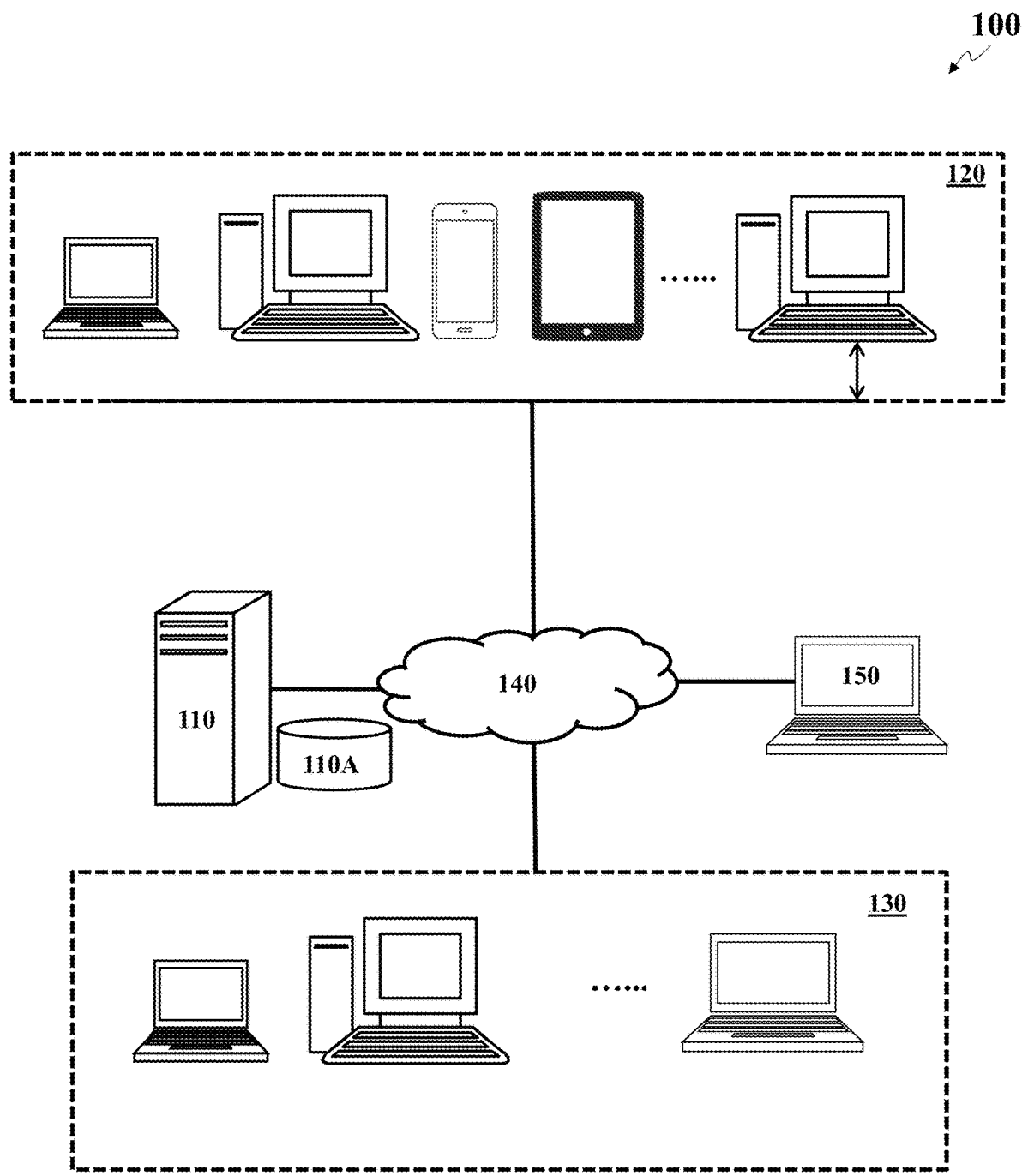
FIG. 1 illustrates a computer system for electronic request routing and distribution, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for routing and distributing electronic requests to appropriate agents. An analytic server receiving a plurality of electronic requests generated by a plurality of customers may determine a target agent for each request where the target agent has the highest probability to satisfy the request (e.g., convert the request to a successful sale). The analytic server may train an artificial intelligence model for each agent based on historical data. The artificial intelligence model may explore the relationship between the set of attributes associated with the customers and the set of attributes associated with the agents for different requests. For each request, the analytic server may take the customer attributes and request attributes as input to each artificial intelligence model. The artificial intelligence model may further use the agent attributes as input to determine a score. The score may indicate the success probability of the corresponding agent.

The analytic server may also determine an order for processing the plurality of requests. Specifically, the analytic server may calculate an entropy value for each request based on the scores. The analytic server may order the requests according to the entropy of each request's score among agents. The analytic server may prioritize requests with lower entropy since the level of certainty is higher for such requests. The analytic server may sort the plurality of requests into a queue in an ascending order based on the entropy values. The analytic server may process the ordered queue of requests sequentially when routing each request to an appropriate agent.

To determine a target agent for each request, the analytic server may determine a capacity value for each agent based on the agent's historical data and ensure that no agent is having more assignments than his/her capacity. The analytic server selects the target agent based on the scores and the capacities. Specifically, the analytic server may identify a set of agents by comparing their scores to the threshold and only include the agents whose scores satisfy the threshold. The analytic server may further identify a subset of agents by only including the agents whose capacities are not full. Thus, the subset of agents comprises the agents whose conversion probabilities satisfy the threshold and who can accept new requests. Among the subset of agents, the analytic server may select one agent who has the highest score. The analytic server may automatically route the request to the target agent's computing device. The analytic server may transmit a notification comprising the request to the target agent's computing device.

FIG. 1 illustrates components of a system 100 for electronic request routing and distribution, according to an embodiment. The system 100 may comprise an analytic server 110, a historical database 110A, a set of electronic user devices 120, a set of agent-computing devices 130, and an administrator-computing device 150 that are connected with each other via hardware and software components of one or more networks 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, where the computing device is configured to route electronic requests to appropriate agents. The analytic server 110 may be logically and physically organized within the same or different devices or structures, and may be distributed across any number of physical structures and locations (e.g., cabinets, rooms, buildings, cities). The analytic server 110 may receive a plurality of electronic requests from a plurality of electronic user devices 120. The request may be an enrollment/registration via a web application. The goal of the analytic server 110 may be to route each request to an appropriate agent-computing device so that the agent operating the agent-computing device may provide the requested service and convert the request to a successful sale. The analytic server 110 may retrieve historical data from the historical database 110A. The analytic server 110 may train an artificial intelligence model for each agent based on the historical data by exploring the individual performance of each agent. For each request, the analytic server 110 may execute the artificial intelligence model of each agent to determine a score for that agent. The score may indicate the probability of the agent satisfying the request (e.g., successfully converting the request to a sale or successfully satisfying an IT problem). The analytic server 110 may select the most appropriate agent based on the scores. In some embodiments, the analytic server 110 may generate a graphical user interface (GUI) on the administrator-computing device 150 displaying a list of potential agents and allow the administrator to select the most appropriate agent by interacting with the GUI. After determining the target agent for a request, the analytic server 110 may route the request to the agent-computing device 130 of that agent.

The historical database 110A may be any non-transitory machine-readable media configured to store existing customers' data, historical requests, and historical agent data. Specifically, the historical data may comprise a plurality of attributes associated with each existing user/customer, a plurality of attributes associated with historical requests, the assignment of historical requests to agents, known results of request conversions, a plurality of attributes associated with each agent, and the like. The historical database 110A may include any other related data of the existing users/customer, requests, and agents that may be used to better analyze and evaluate the performance of the agents.

To train an artificial intelligence model for each agent, the analytic server 110 may create an agent specific train set for each specific agent. The analytic server may retrieve historical data only associated with a specific agent from the historical database 110A. For example, the historical data only associated with the specific agent may comprise historical requests associated with that agent, the status of conversion of such historical requests, attributes of customers generating such historical requests, the agent's attributes, and the like. The analytic server 110 may further process the agent specific historical data to prepare the train set for modeling. For example, the analytic server 110 may remove data not useful for the modeling and impute missing values.

For example, the artificial intelligence model may explore agent-customer interactive features based on historical data for a certain type of request. The analytic server may train the artificial intelligence model by using Bayesian logistic regression (BLR) or random forest (RF).

The set of electronic user devices 120 may be any computing device allowing a user to interact with the analytic server 110 and the agent-computing devices 130. The electronic user devices 120 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 120 may comprise any number of input and output devices supporting various types of data, such as text, image, audio, video, and the like. A new customer/user operating the electronic user device 120 may issue an electronic request to the analytic server. The request may be an enrollment via a web application. For example, the analytic server 110 may provide a web application (e.g., a hyperlink of a website) that allows customers to register or enroll. The customers may input user information and the requested product information by interacting with the graphical user interface (GUI) of the web application for the enrollment.

The analytic server 110 may receive a plurality of electronic requests from the set of electronic user devices 120. The analytic server 110 may process and route the plurality of electronic requests in an order based on an entropy value. Specifically, the analytic server 110 may calculate the entropy for each request based on the scores. The analytic server 110 may prioritize requests with lower entropy since the level of certainty is higher for such requests. Therefore, the analytic server 110 may sort the plurality of requests into a queue in an ascending order based on the entropy values. The analytic server 110 may process the ordered queue of requests sequentially when routing each request to an appropriate agent.

The analytic server 110 may route the plurality of electronic requests based on the score and capacity of each agent. As discussed above, each score may indicate the corresponding agent's success probability. The capacity may be the maximum number of active requests an agent can accept without sacrificing performance. The analytic server 110 may calculate the capacity based on each agent's historical data. For a request, the analytic server 110 may identify a set of agents by comparing their scores to a threshold and only include the agents whose scores satisfy the threshold. The analytic server 110 may further identify a subset of agents by only including the agents whose capacities are not full. Thus, the subset of agents comprises the agents whose conversion probabilities satisfy the threshold and who can accept new requests. Among the subset of agents, the analytic server 110 may select one agent who has the highest score.

The set of agent-computing devices 130 may be any computing device allowing an agent, such as an advisor from the company/organization, to interact with the electronic user devices 120. The agent-computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The agent-computing device 130 may comprise any number of input and output devices supporting various types of data, such as text, image, audio, video, and the like. After the analytic server 110 determines the target agent for a request, the analytic server may route the request to the corresponding agent-computing device 130. The analytic server 110 may transmit a notification comprising the request to the agent-computing device 130. The analytic server 110 may transmit the notification as an electronic message, such as an email. In some configurations, the analytic server 110 may transmit a push notification to an application executing on the target agent's computing device 130. The agents operating the agent-computing devices 130 may provide the requested services and aim to convert the request to a successful sale.

The administrator-computing device 150 may be any computing device allowing an administrator to interact with the analytic server 110. The administrator-computing device 150 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The administrator-computing device 150 may comprise any number of input and output devices supporting various types of data, such as text, image, audio, video, and the like.

In some other embodiments, the analytic server 110 may allow the administrator operating the administrator-computing device 150 to select the target agent. The analytic server 110 may generate a GUI comprising an indicator for each agent within the subset of agents. The indicator may comprise each agent's ID, score, location, historical success ratio, title, capacity, current number of active requests, and the like. The analytic server 110 may display the agent indicators in an order ranked by the scores. The administrator may select the target agent by interacting with the corresponding indicator. After receiving the selected target agent from the administrator-computing device 150, the analytic server 110 may route the request to the selected target agent's computing device 130.

Figure 2:
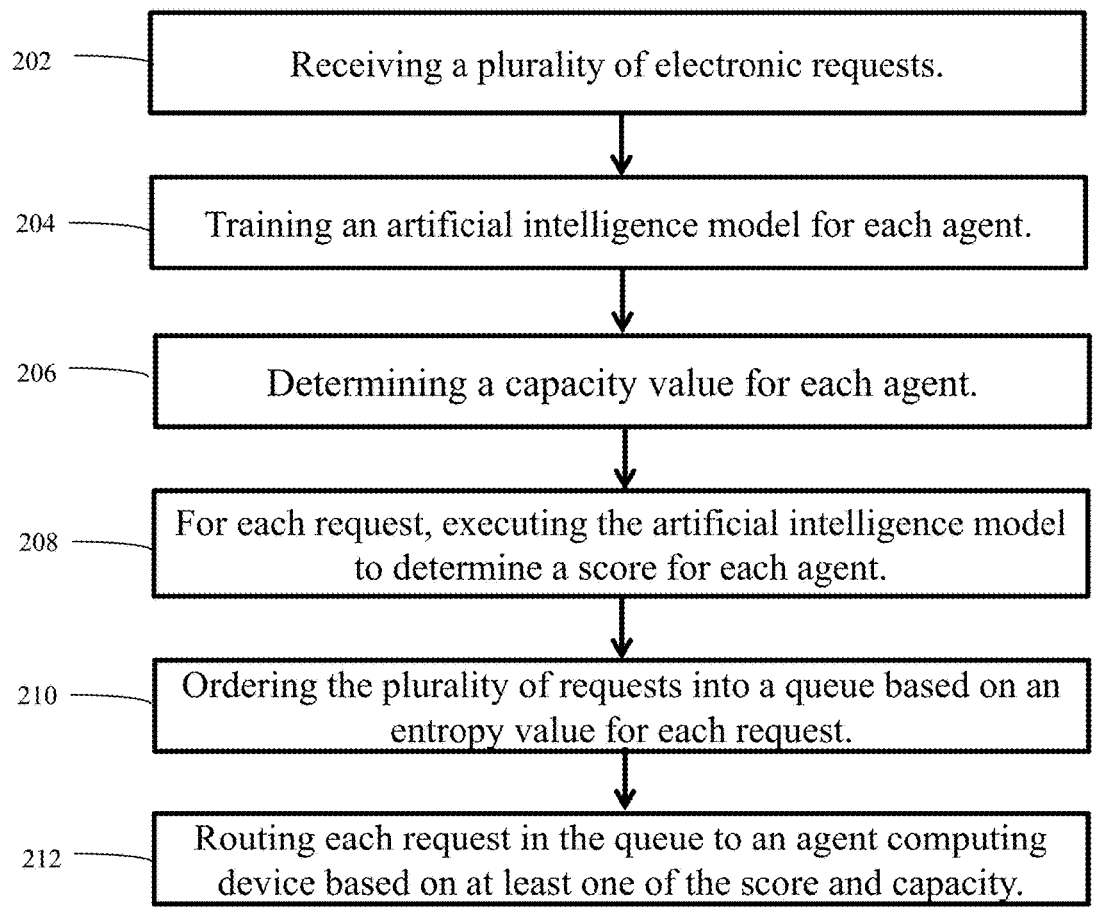
FIG. 2 illustrates a flowchart depicting operational steps for electronic request routing and distribution, according to an embodiment.

FIG. 2 illustrates execution of a method 200 for electronic request routing and distribution, according to an embodiment. Other embodiments may comprise additional or alternative steps, or may omit some steps altogether.

At step 202, the analytic server may receive a plurality of electronic requests from a plurality of electronic user devices. The request may be an enrollment via a web application or a browser application. For example, the analytic server may provide a web application (e.g., a hyperlink of a website) that allows customers to register or enroll. The customers may input user information and the requested product information by interacting with the graphical user interface (GUI) of the web application for the enrollment.

Each electronic request may comprise a set of attributes associated with the request and a set of attributes associated with the user generating the request. The user generating the request may be a customer operating the electronic device. For example, the set of attributes associated with the user may comprise age, gender, opportunity type, total compensation, organization identifier, region, and the like. The set of attributes associated with the user may also comprise features related with each enrollment, such as commission, number of contacts, sale ratio, terminated status, owned product, population density, time since first enrollment, time since last contact, time since last sale, and the like. The set of attributes associated with the request may comprise the type of requested product (policy), the value of requested product, the status of the request, and the like.

Upon receiving the customers' requests, the analytic server may open an enrollment account for each customer. The goal of the analytic server is to route each electronic request to an appropriate agent who can successfully satisfy the electronic request (e.g., convert the enrollment to a sale). The analytic server may retrieve the customer attributes, the agent attributes and the agent-customer interactive features to determine the appropriate agent for each customer request.

In a non-limiting example, a user may execute a browser application (e.g., web application) to access a website generated/maintained by the analytic server. The user may then generate and transmit a request to the analytics server. For instance, the user may input various user attributes (e.g., demographic data) and a request to be matched with an employee to purchase a product or enroll in a service. The request may also include request attributes, which are inputted by the user. An example of request attribute may include a type of product (e.g., attributes of the product) or services requested by the user.

At step 204, the analytic server may train an artificial intelligence model for each agent based on historical data. The analytic server may train the artificial intelligence model by exploring the individual performance of each agent. In operation, the analytic server may retrieve historical agent data from the historical database and separate the data into a 10% test set and a 90% train set according to the request date. For example, the test set may correspond to data in the second half of 2017 and the train set may correspond to data from 2011 until May 2017.

Data Retrieval

The analytic server may retrieve the customer attribute data. The customer attribute data may include customer basic information and demographics, such as name, date of birth, gender, address, social security number (SSN), customer professional information, such as employer, job title, employer location, customer classification status, such as new eligible, not purchased a product after first contact, not purchased after two contacts. The customer attribute data may also include income information that holds financial information for each customer at every year after the customer has an open enrollment. The income information may include salary, bonus, commission, benefit and total compensation of each customer. The customer attribute data may also include opportunity information, such as a list of all open opportunities when an enrollment opens for the customer. The opportunity information may help agents to recommend the right policy to the customer. The customer attribute data may also include organization data, which is information about the customer's employer. The customer attribute data may also include policy data that is information about the final policy for each customer including the type of policy, value and status. In addition to customer data, the analytic server may also retrieve the agent relationship, which may be the complete list of active agents with all assigned enrollments, active agents' personal and professional information and demographics including name, date of birth, gender, address, tile, and appointment data that shows the type of policy that each advisor is licensed to sell.

Data Exploration

After retrieving the data and joining the agent information to the customer information, the analytic server may build a dataset that includes all enrollments and agents' assignments and whether an enrollment resulted in a sale or not. The initial dataset had 58,092 enrollments from 2011 to 2017 with an overall 21% conversion ratio. In order to build the artificial intelligence model, the analytic server may extract essential information for each agent. The analytic server may only keep agents who historically had enrollments and study the distribution of enrollments and sales per agent.

Some agents may not have enough information. The analytic server may remove the agents with less than 10 enrollments.

The next essential part of data exploration may be the distribution of the data across years. This is essential because the data is a time series. The analytic server may apply the most recent portion of the data on the training of the artificial intelligence model. Specifically, if the analytic server includes historical relationship between the customers and the agents as a feature in the model, it may be more precise to keep the last part of the data as the test set. As a result, the analytic server may hold the data in the second half of 2017 as the test set. The train set may correspond to data from 2011 until May 2017.

Because the train set include the first portion of the data in 2017 (e.g., until May 2017), the model may reflect the most recent performance of the agent. In addition, the analytic server may investigate the historical data and determine that the train set and the test set include all agents' information, which makes the train set and test set appropriate for the model.

Feature Preparation

Based on the format and structure of the data, the analytic server may extract customer based features and agent-customer interactive features. The customer-based features may include age, gender, opportunity type, total compensation, organization identifier (ID), and region, commission, number of contacts, commission, number of contacts, sale ratio, terminated status, owned product, population density, time since first enrollment, time since last contact, time since last sale, and the like. The agent-customer interactive features may include region match, same age or younger, gender match, number of contacts with agents, sale ratio with agent, and the like.

The analytic server may investigate the skewness of data by investigating the distribution of interactive features. The analytic server may study the historical assignments of enrollments to agents to determine whether some features are biased. First, the analytic server may calculate the distribution of assignments across regions. The analytic server may determine that within United States, although the locations are skewed toward being in the same region, there are cross-location assignments for agents in all regions. Furthermore, the analytic server may study the assignment distributions across age and gender. The distribution may show that almost 50% of the assignments are assigned to people with same age and same gender. The analytic server may also determine that assignments are rarely distributed to agents who are older than the customer. Identifying different conversion ratio across these characteristics may indicate that these features are potential good predictive features.

Pooled in Conversion Model

The pooled in model may capture and derive the top variables and overall drivers that lead to a successful sale regardless of the advisor. The analytic server may prepare the feature matrix for pooled in model. Specifically, the analytic server may drop columns that will not be useful for modeling, such as names, identifiers (IDs), and the like. The analytic server may drop columns that have zero variance (e.g., having unique values only) or "near zero" variance. The "near zero" variance means that the variance either has very few unique values relative to the number of samples or the ratio of the frequency of the most common value to the frequency of the second most common value is large (e.g., >500). The analytic server may impute missing values and save the final column names and imputation.

The analytic server may try three models including logistic regression, gradient boosting, and random forest. Based on the results, the analytic server may select random forest as the final model. The analytic server may train the model on train set and apply the trained model on the test set. The final AUC (area under curve) of the test set is 78.4%. The AUC is an indicative the prediction accuracy. The final variables that may lead to a successful sale may include product name, total compensation, population, age, time since last contact, time since first contact, region, opportunity type, number of contacts, sale ratio, number of contacts with an agent, sale ratio with an agent, gender match, same age or younger.

Agent-Based Conversion Model

After investigating the overall driver for conversion, the analytic server may explore the individual performance of each agent and build an assessment of each agent's drivers. For each agent, the analytic server may train a conversion model, which is an artificial intelligence model trained based on historical data specific to that particular agent.

In operation, the analytic server may retrieve historical data from the historical database and separate the data into 10% test set and 90% train set according to the request date. For example, the test set may correspond to the second half of 2017 and the train set may correspond to all requests from 2011 until May 2017.

On the train set and for each agent, the analytic server may create agent specific train set by retrieving historical data only associated with a specific agent from the historical database. For example, the historical data only associated with the specific agent may comprise historical requests associated with that agent, the status of conversion of such historical requests, attributes of customers generating such historical requests, the agent's attributes, and the like.

The analytic server may further process the agent specific historical data by removing data not useful for the modeling and imputing missing values. Specifically, the analytic server may drop columns that will not be useful for modeling, such as names, identifiers (IDs), and the like. The analytic server may drop columns that have zero variance (e.g., having unique values only) or "near zero" variance. The "near zero" variance means that the variance either has very few unique values relative to the number of samples or the ratio of the frequency of the most common value to the frequency of the second most common value is large (e.g., >500). The analytic server may impute missing values and save the final column names and imputation.

The analytic server may train the artificial intelligence model (e.g., conversion model) by using Bayesian logistic regression (BLR) or random forest (RF). The analytic server may build N (number of agents) Bayesian models with a Cauchy prior with median 0.0 and scale 2.5. The average AUC value across all Bayesian models is 0.71. The analytic server may also build N RF models. The average AUC value across all Bayesian models is 0.71.

Figure 3:
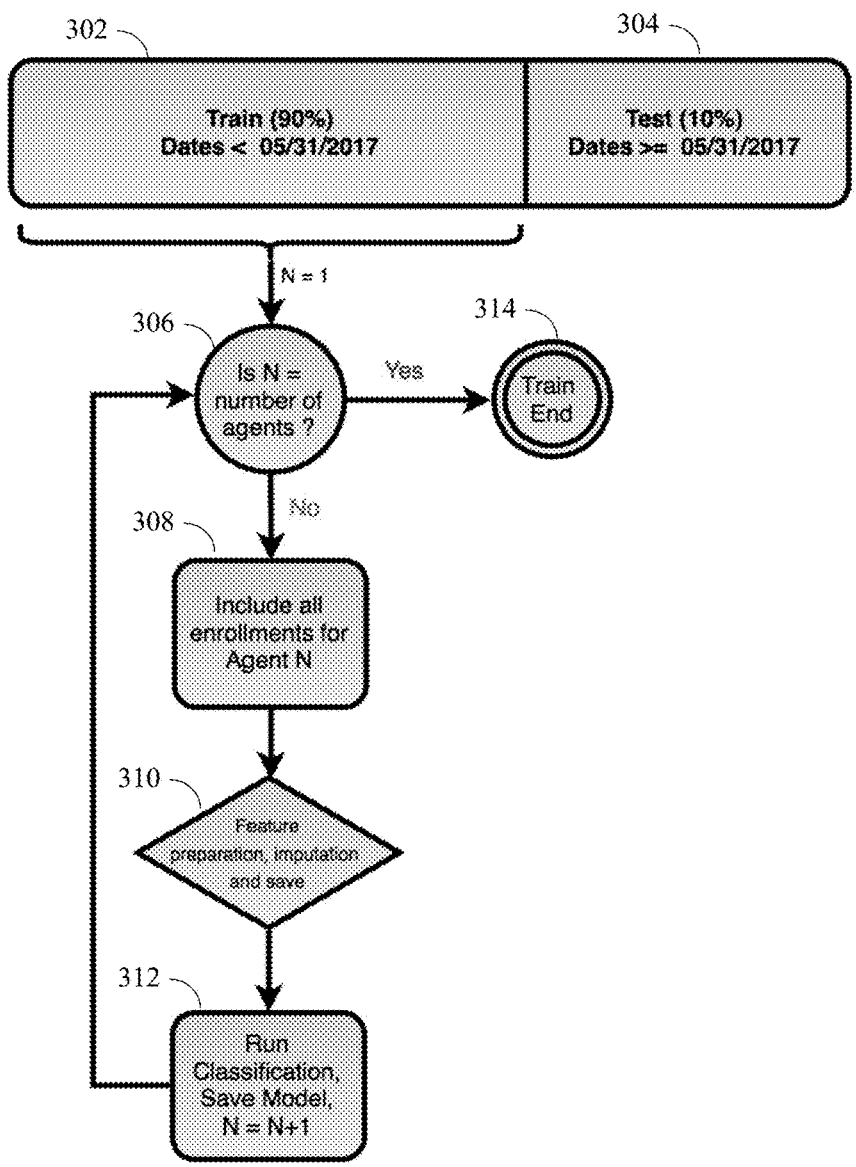
FIG. 3 illustrates a process for training an artificial intelligence model for each agent, according to an embodiment.

The artificial intelligence model may explore the relationship between the set of attributes associated with the customers and the set of attributes associated with the agents for different requests. For example, the artificial intelligence model may explore agent-customer interactive features based on historical data for a certain type of request. The agent-customer interactive features may comprise region match, gender match, same age or younger, number of contacts with agent, sale ratio with agent. Specifically, the analytic server may calculate the distribution of request assignments across regions, the distribution of request assignments across age and gender. The analytic server may train an artificial intelligence model for each agent based on such features. FIG. 3 illustrates a process for training an artificial intelligence model for each agent, according to an embodiment.

At step 206, the analytic server may determine a capacity value for each agent based on the agent's historical data. The capacity value may be the maximum number of active requests an agent can accept without sacrificing performance. In the process of routing requests, the analytic server may assign requests to different agents. The analytic server may ensure that no agent is having more assignments than his/her capacity. The capacity may be the upper bound of the assignments for an agent.

In order to calculate the capacity, the analytic server may create a time series algorithm that at each point in time calculates the number of active requests for each agent and the success ratio (e.g., number of requests that resulted in sale over number of total requests).

FIGS. 4A-4F illustrate the process of determining the capacity for an agent, according to an embodiment. For each agent, the analytic server may follow the following steps:

First, the analytic server may fit multiple polynomial surfaces (e.g., fitted curves) on the agent's historical data (e.g., success ratio relative to number of enrollments). The polynomial surfaces may comprise a smoothing parameter, which controls the degree of smoothing.

Second, as the smoothing parameter changes, the accuracy of the fitted curve also changes. The analytic server may define the function that computes the sum of squared errors (SSE). The analytic server may search the value for smoothing parameter by trying different values in a predetermined scope and determine the value that produces the smallest SSE as the smoothing parameter. After determining the smoothing parameter, the analytic server may determine the most accurate polynomial surface, which is the best-fitted curve on the data.

Third, the analytic server may calculate all points of local maxima of the fitted curve, including the first and last point of curve. The analytic server may set the capacity of the agent as the number of requests of the last local maxima that is above the average success ratio of the agent.

Fourth, for agents whose last local maxima is the last point of the curve and the polynomial curve is upward, the analytic server may further fit a linear line. The linear line may determine the trend of the success ratio relative to the number of requests. For example, an upward trend may show an overall improvement in success ratio when request number increases, while a downward trend shows the success ratio decreases when the request number increases.

The purpose of this step is to find the capacity for agents who have had satisfactory performance and have not be assigned large number of requests. For example, the agents whose last local maxima is the last point of the curve and the polynomial curve is upward may be agents who have had satisfactory performance and have not be assigned large number of requests. The analytic server may identify those agents whose capacity is beyond their historical records. The analytic server may determine the capacity for such agents using the method in the following step (e.g., step 5).

Fifth, for agents who satisfy two criteria: a) the last local maxima is within the top 20% of the requests, b) the slope of the linear curve is positive or close to flat, the analytic server may set the capacity value as the maximum number of request that existed in the historical data at a time regardless of which agent the maximum number belongs to.

At step 208, for each request, the analytic server may execute the artificial intelligence model for each agent to determine a score for each agent. Assuming there are M requests and N agents. The output may be a matrix of size M*N with each value of the matrix being the score of a particular agent for a particular request. The analytic server may take the customer attributes and request attributes as input to each artificial intelligence model. The artificial intelligence model may determine a score based on the relationship between customers' attributes and agent attributes for the type of request (e.g., request attributes). Each artificial intelligence model may output a score for the corresponding agent. The score may be a value indicating the probability of the agent satisfying the electronic request (e.g., the agent converting the enrollment to a successful sale).

At step 210, the analytic server may order the plurality of requests into a queue based on an entropy value of each request. The analytic server may calculate the entropy for each request by calculating Entropy $(request_j) = -\Sigma_{i=1}^{N} P_{i,j} \log_N(P_{i,j})$, where j is the request index and i is the agent index, and $P_{i,j}$ is the score of agent i for request j. The entropy value may be corresponding to a score of each agent in relation to the request. The analytic server may order the requests according to the entropy of each request's score among agents. The analytic server may prioritize requests with lower entropy since the level of certainty is higher for such requests. For example, if a request has a success probability of 0.99 with agent A and 0 with all other agents (entropy approximately equals to 0), the analytic server should assign this request first because the level of certainty of this request is higher than a request having a 0.5 success probability with all agents (entropy approximately equals to 1). Therefore, the analytic server may sort the plurality of requests into a queue in an ascending order based on the entropy values. For example, the request with the lowest entropy may come in the first place in the queue. The analytic server may initiate the selecting of the appropriate agent for an electronic request with the lowest entropy value. The analytic server may route the plurality of requests according to the order of the queue. The analytic server may process the ordered queue of requests sequentially when routing each request to an appropriate agent.

At step 212, the analytic server may iteratively route/transmit each request in the queue to an agent-computing device based on at least one of the score and the capacity. In operation, the analytic server may set a threshold for the score value. As discussed above, for each request, the analytic server may calculate a score for each agent indicating the probability of the agent satisfying the request (e.g., successfully converting the request into a sale). For a request, the analytic server may identify a set of agents by comparing their scores to the threshold and only include the agents whose scores satisfy the threshold. The analytic server may further filter the set of agents based on their capacities. The analytic server may retrieve the number of active assignments for each agent and determine if the number of active assignments exceeds the agent's capacity. The analytic server may further identify a subset of agents by only including the agents whose capacities are not full (e.g., whose active requests are less than their capacities). Thus, the subset of agents comprises the agents whose success probabilities satisfy the threshold and who can accept new requests. Among the subset of agents, the analytic server may select one agent who has the highest score. In other words, the analytic server may select the agent who has the highest probability to satisfy the request.

However, if the subset of agents is empty which means there are no agents whose conversion probabilities satisfy the threshold and whose capacities are not full, the analytic server may reset the threshold. For example, the analytic server may set a new threshold value that is lower than the original threshold. As a result, the analytic server may include more agents in the set of agents whose scores satisfy the new threshold. In the larger set of agents, the analytic server may further identify the subset of agents whose capacities are not full. If the subset of agents is still empty, the analytic server may further decrease the threshold to include an even larger set of agents. The analytic server may recursively perform this process until the subset of agents is not empty.

In some embodiments, the analytic server may automatically determine a target agent for the request and route the request to the target agent's computing device. The analytic server may select the agent with the highest score in the subset of agents as the target agent and automatically route the request to the target agent's computing device. The analytic server may also update the number of active requests assigned to the target agent by adding the new assignment. To route/assign the request to the target agent, the analytic server may transmit a notification comprising the request to the target agent's computing device. The analytic server may transmit the notification as an electronic message, such as an email. In some configurations, the analytic server may transmit a push notification to an application executing on the target agent's computing device. The application executing on each agent's computing device may be a web application allowing the agents to interact with the customers, provide the requested services, and satisfy the request (e.g., convert the requests into successful sales). In some embodiments, the analytic server may transmit the user's electronic request to the target agent's computing device in real time by directing the user to a webpage displaying the data associated with the target agent.

In some other embodiments, the analytic server may allow an administrator to select the target agent. The analytic server may generate a GUI comprising an indicator for each agent within the subset of agents. The indicator may comprise each agent's ID, score, location, historical success ratio, title, capacity, current number of active requests, and the like. The analytic server may display the agent indicators in an order ranked by the scores. An administrator may select the target agent by interacting with the corresponding indicator.

FIG. 3 illustrates a process for training an artificial intelligence model for each agent, according to an embodiment. The analytic server may retrieve historical data from the historical database and separate the data into 10% test set and 90% train set according to the request date. For example, the 90% train set 302 may correspond to all enrollments from 2011 until May 31, 2017, and the 10% test set 304 may correspond to enrollments after May 31, 2017.

For a first agent (e.g., N=1), the analytic server may create an agent specific train set by retrieving historical enrollment data only associated with the first agent 308. The analytic server may perform the feature preparation, imputation and save the features 310. Specifically, the analytic server may extract the customer based features and the agent-customer interactive features. The analytic server may prepare the features by dropping columns that are not useful for modeling and may impute missing values. The analytic server may save the final column names and imputation. The analytic server may train the artificial intelligence model (e.g., conversion model) for the first agent, run the classification, and save the model for the first agent 312. The analytic server may train the artificial intelligence model and run the classification by exploring the relationship between the set of attributes associated with the customers and the set of attributes associated with the agents for different requests. The analytic server may proceed to train the artificial intelligence model for the second agent (e.g., N=N+1 312). The analytic server may repeat the training process for each agent until the last agent. For example, if N does not reach the number of agents 306, the analytic server may repeat the training process. After the analytic server trains the artificial intelligence model for the last agent, the training process ends 314.

Figure 4A:
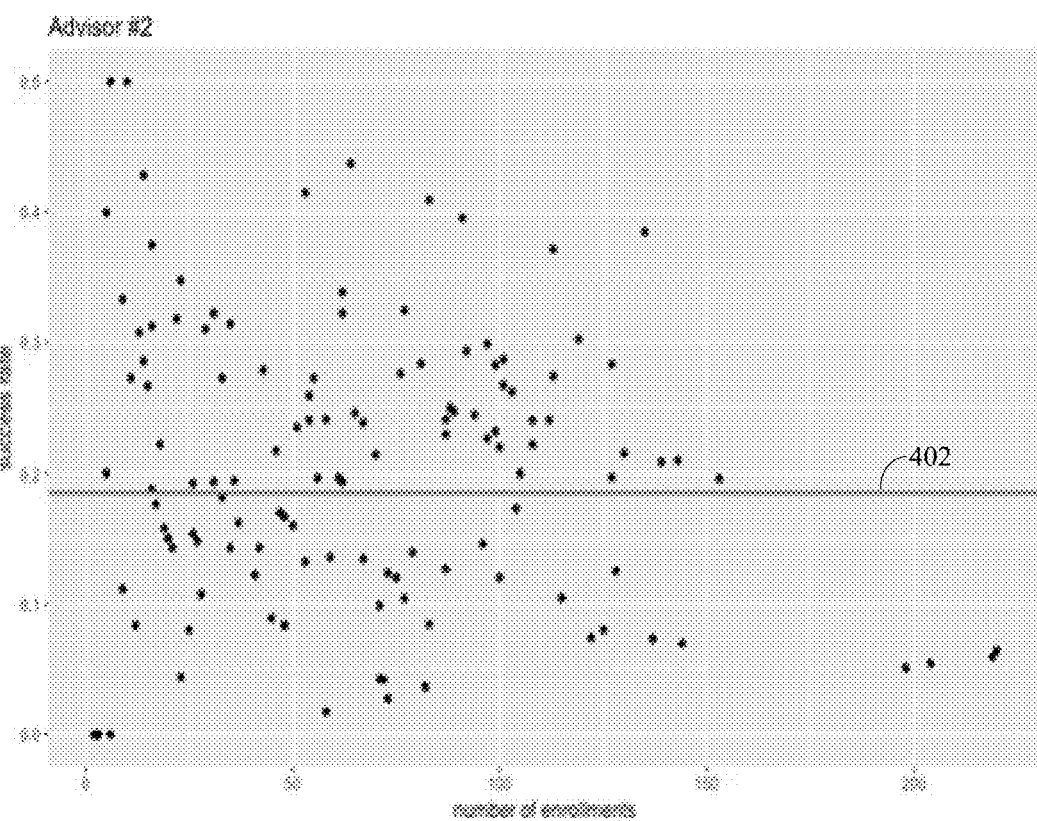
FIG. 4A illustrates the success ratios of an agent with different numbers of enrollments, according to an embodiment.

FIG. 4A illustrates the success ratios of an agent with different numbers of enrollments 400A, according to an embodiment. The analytic server may use agent #2 as an example. The data points in the figure may be the success ratios of the agent with different numbers of enrollments (success ratio relative to numbers of enrollments). The horizontal line 402 may indicate the average success ratio of agent #2.

Figure 4B:
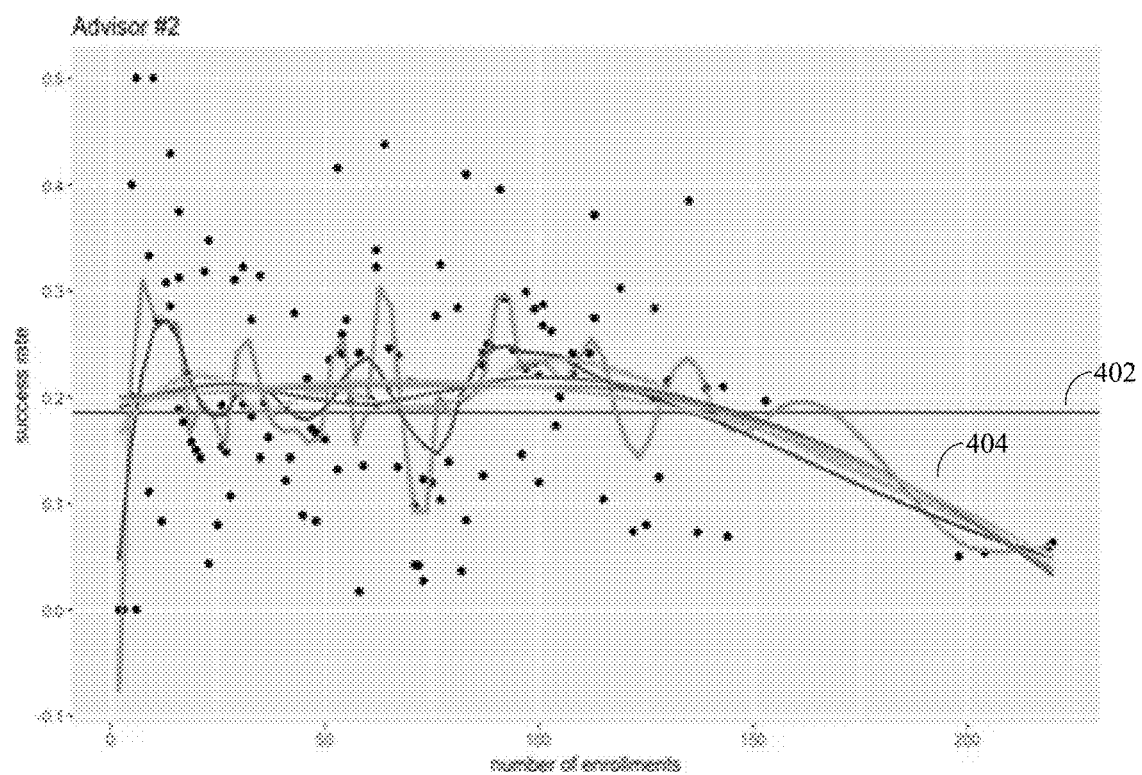
FIG. 4B illustrates multiple fitted curves for the success ratio of an agent, according to an embodiment.

FIG. 4B illustrates multiple fitted curves 400B for the success ratio of an agent, according to an embodiment. The analytic server may fit multiple polynomial surfaces (e.g., fitted curves) 404 on the agent's historical data (e.g., success ratio relative to number of enrollments). The curve fitting is the process of constructing a curve or mathematical function that has the best fit to a series of data points (e.g., the data points in FIG. 4A). The polynomial surfaces 404 may be the fitted curves that may be an aid for data visualization to infer values of a function where no data are available and to summarize the relationship among one or more variables. The polynomial surfaces 404 may comprise a smoothing parameter, which controls the degree of smoothing. In statistics and image processing, to smooth a data set is to create an approximating function that attempts to capture important patterns in the data, while leaving out noise or other fine-scale structures/rapid phenomena.

Figure 4C:
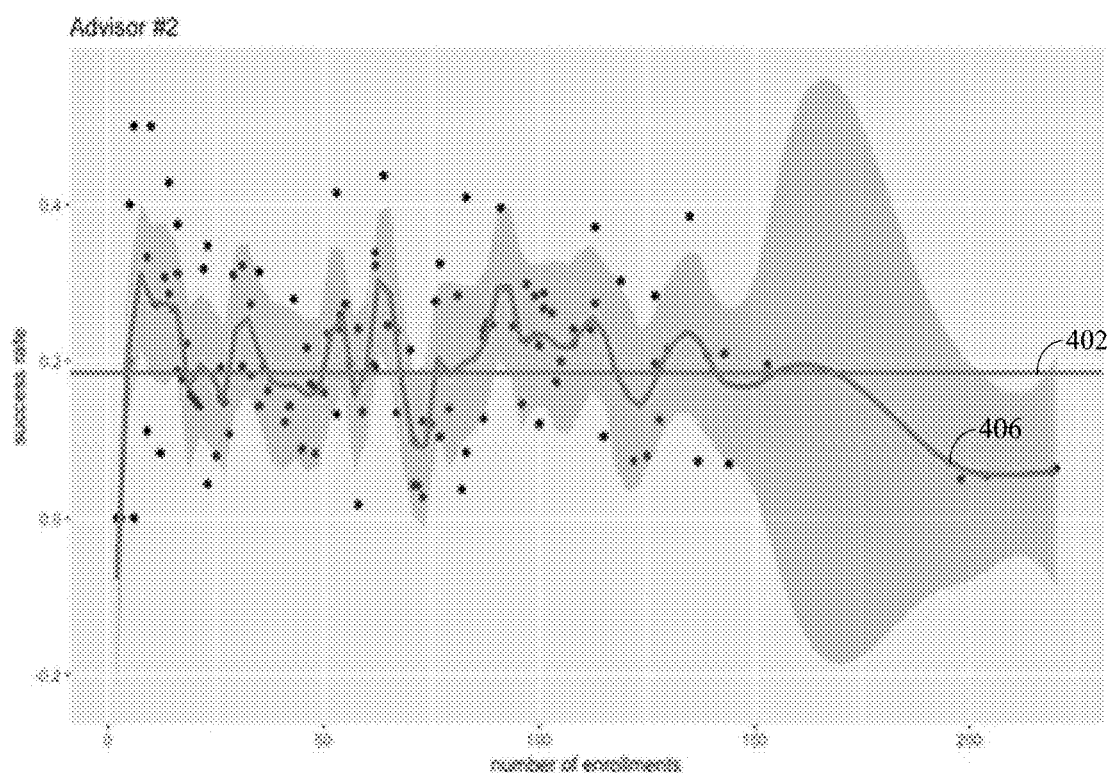
FIG. 4C illustrates the best-fitted curve for the success ratio of an agent, according to an embodiment.

FIG. 4C illustrates the best-fitted curve 400C for the success ratio of an agent, according to an embodiment. The analytic server may compute the sum of squared errors (SSE). The analytic server may search the value for smoothing parameter by trying different values in a predetermined scope and determine the value that produces the smallest SSE as the smoothing parameter. In this example, the analytic server may search smoothing parameter from 0.1 to 2.5 with 0.05 steps and determine that the best fit happens with smoothing parameter being 0.2. After determine the smoothing parameter, the analytic server may determine the most accurate polynomial surface, which is the best-fitted curve 406 on the data.

Figure 4D:
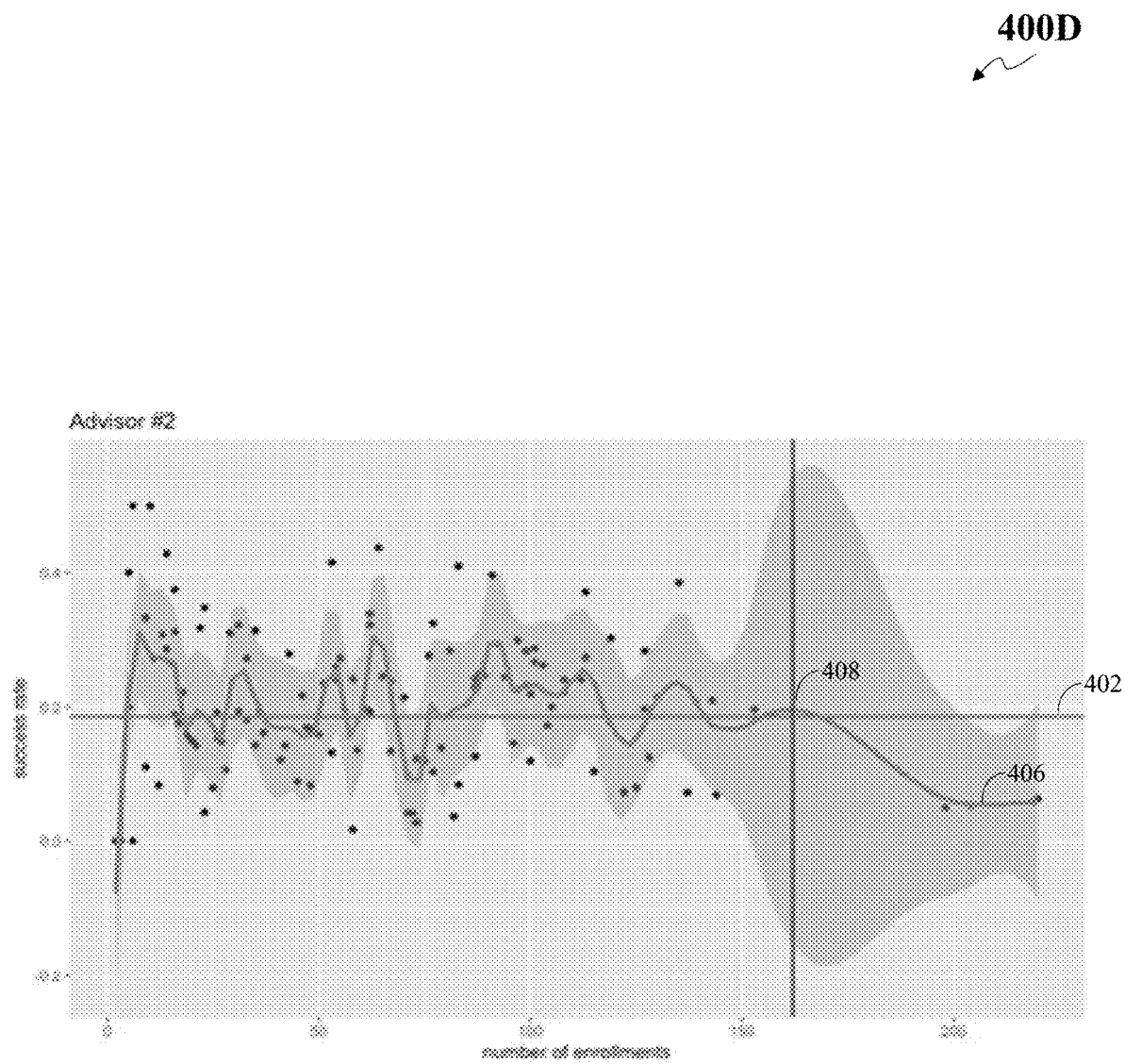
FIG. 4D illustrates the capacity of an agent, according to an embodiment.

FIG. 4D illustrates the capacity 400D of an agent, according to an embodiment. The analytic server may calculate all points of local maxima of the fitted curve, including the first and last point of curve. The analytic server may set the capacity of the agent as the number of enrollments of the last local maxima 408 that is above the average success ratio of the agent.

Figure 4E:
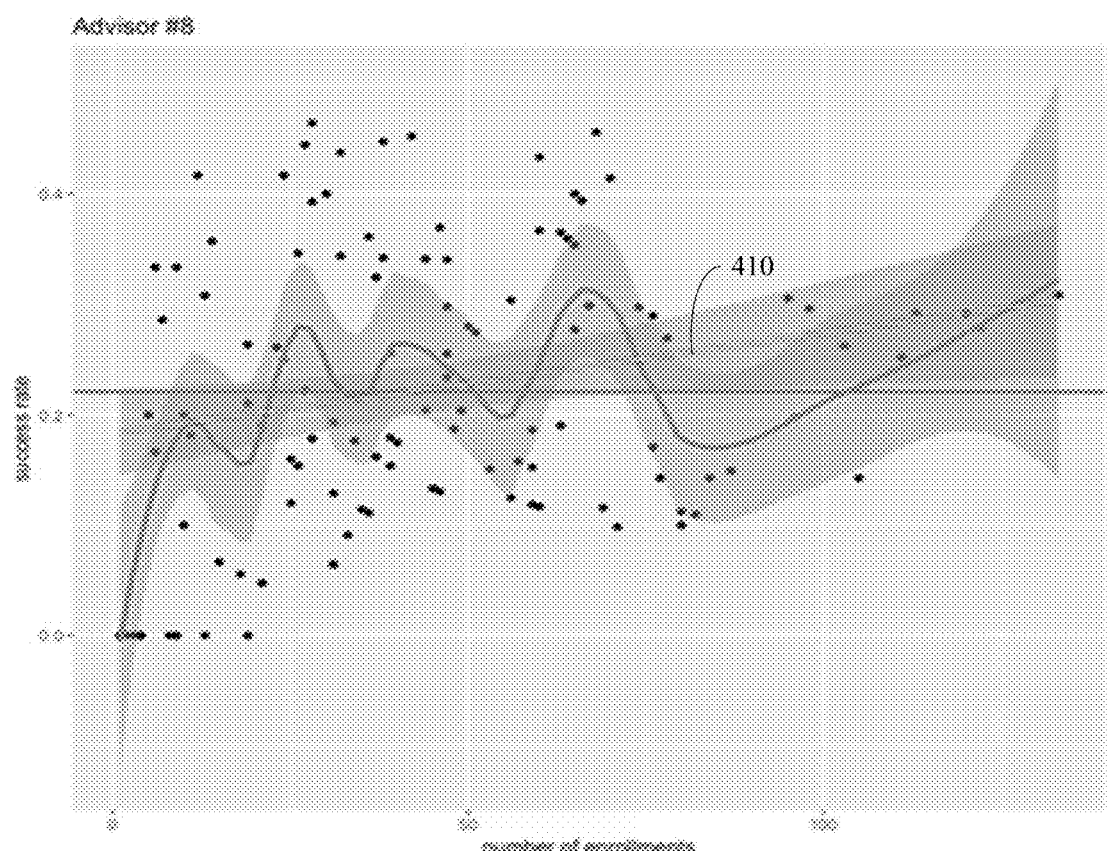
FIG. 4E illustrates an upward trend of success ratio of an agent, according to an embodiment.

FIG. 4E illustrates an upward trend 400E of success ratio of an agent, according to an embodiment. The analytic server may use agent #8 as an example. The analytic server may fit a linear line 410 to determine the trend of the success ratio relative to the number of enrollments. The success ratio of the agent may show an upward trend, which is an overall improvement when the number of enrollments increases. The analytic server may determine that agent #8 have had satisfactory performance and have not be assigned large number of requests. If the last local maxima is within the top 20% of the requests/enrollments, the analytic server may set the capacity value as the maximum number of request that existed in the historical data at a time regardless to which agent the maximum number belongs.

Figure 4F:
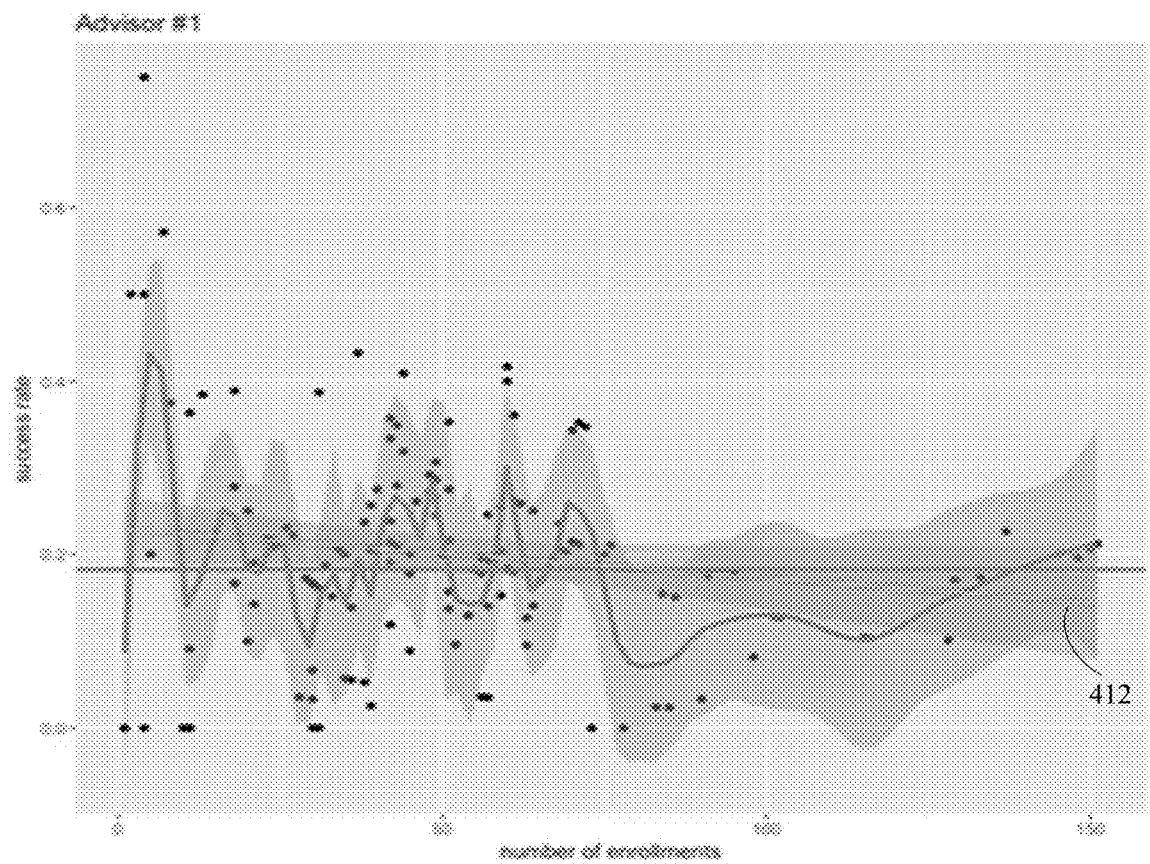
FIG. 4F illustrates a downward trend of success ratio of an agent, according to an embodiment.

FIG. 4F illustrates a downward trend 400F of success ratio of an agent, according to an embodiment. The analytic server may use agent #1 as an example. The analytic server may fit a linear line 412 to determine the trend of the success ratio relative to the number of enrollments. The success ratio of the agent may show a downward/negative trend. The analytic server may determine that agent #1 have had satisfactory performance. The analytic server may set the capacity of the agent as the number of enrollments of the last local maxima that is above the average success ratio of the agent.

Figure 5A:
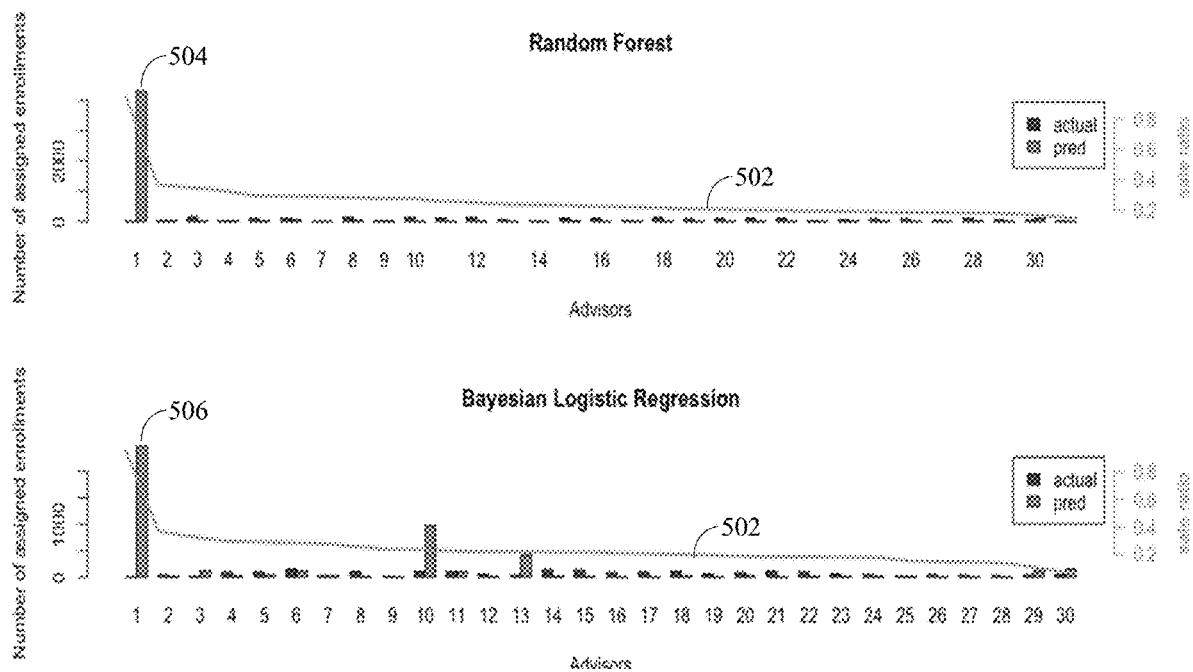
FIG. 5A illustrates enrollment assignment without agent capacity, according to an embodiment.

FIG. 5A illustrates enrollment assignment 500A without agent capacity, according to an embodiment. The analytic server may assign new enrollments to agents by selecting the agent with the highest score. As a result, the agents with higher success rate may receive more assignments. The lines 502 in the figure may be the success rate of the agents. As shown in the figure, agent #1 may have a 0.95 success rate. Agent #1 may receive more than 3000 assignments in both random forest model 504 and Bayesian logistic regression model 506. In addition, only 33 or less agents may receive assignments. The assignments in both models may be unacceptable. As a result, it is necessary to have agent-specific capacity as an upper bound on number of assigned enrollments.

Figure 5B:
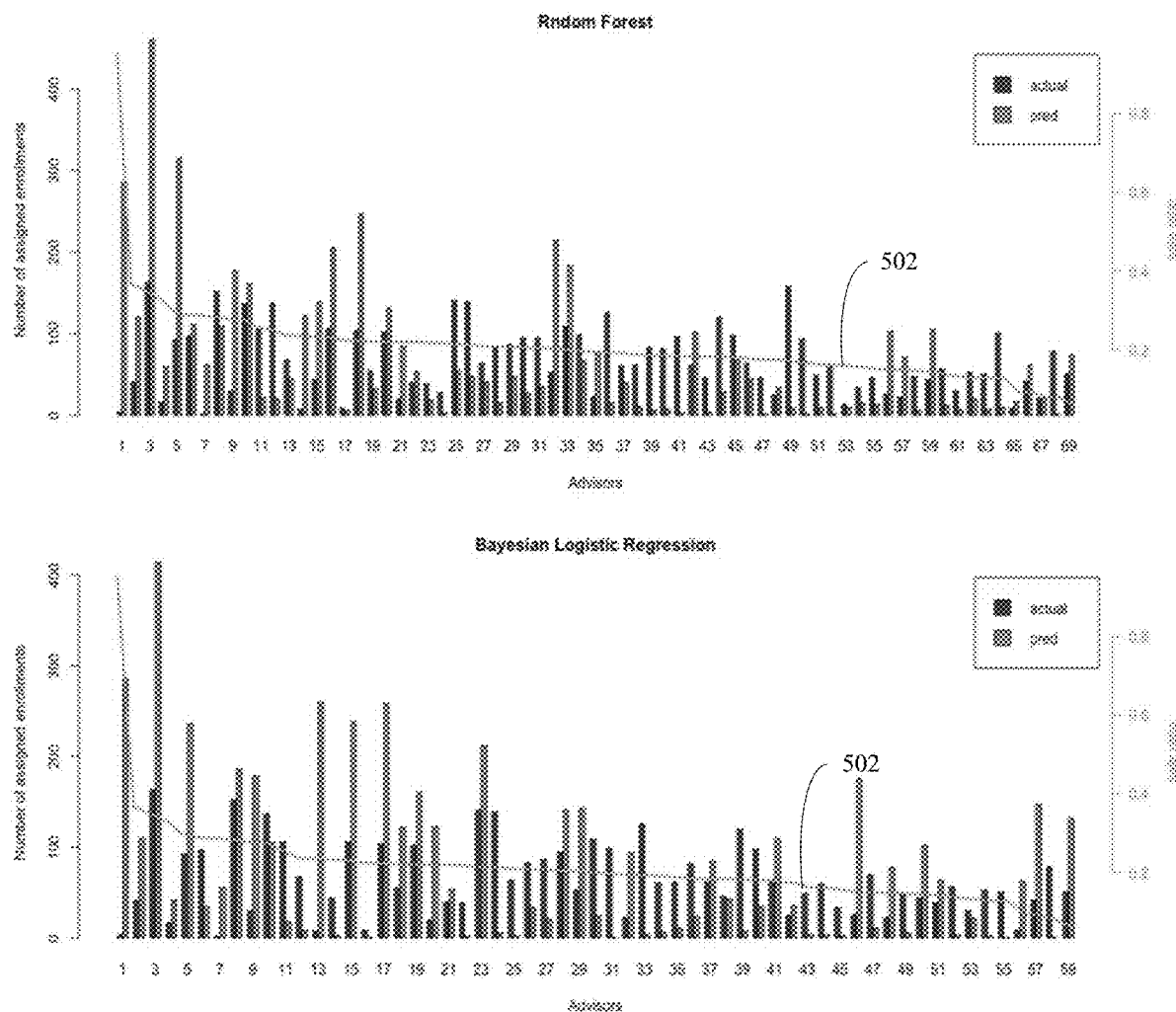
FIG. 5B illustrates enrollment assignment with agent capacity, according to an embodiment.

FIG. 5B illustrates enrollment assignment 500B with agent capacity, according to an embodiment. The line 502 in the figure may be the success rate of the agents. As shown in the figure, the assignment in both random forest model and Bayesian logistic regression model is more uniform comparing with the assignment in FIG. 5A. All of the agents receive assignments in both models.

FIG. 6A illustrates the model performance compared with historical assignment performance 600A, according to an embodiment. The analytic server may calculate the model performance as follows. After assigning the enrollments to agents, the analytic server may separate the enrollments for which the recommended agent in the models is the same agent that the customer is assigned to in reality. Assume the total number of such enrollments is E1. Among the E1 enrollments, the model recommends the same agent to the customer as the ground truth, the analytic server may calculate the number of cases that the customer actually purchased a product from that agent (e.g., positive sale). Assume the number of positive sales is S1. The analytic server may calculate the model performance as S1/E1.

The analytic server may calculate the historical assignment performance as follows. The analytic server may randomly select the same number of enrollments across test set. For example, the analytic server may sample E1 cases from the test set. The analytic server may count the number of cases that the sale is positive. Assume the number of positive sales is S2. The analytic server may calculate the historical assignment performance as S2/E1.

As shown in FIG. 6A, the random forest model may achieve 64% conversion rate, the Bayesian logistic regression model may achieve 45% conversion rate 602. The historical assignment may achieve 13% conversion rate 604. Therefore, both the random forest model and the Bayesian logistic regression model discussed herein achieve better performance than the historical assignment, which is the standard assignment in conventional systems.

FIG. 6B illustrates the model performance compared with random assignment performance 600B, according to an embodiment. As discussed above, the analytic server may calculate the model performance as S1/E1.

The analytic server may calculate the random assignment performance as follows. The analytic server may randomly assign each enrollment in the test set to a randomly selected agent. The analytic server may separate the enrollments for which the recommended agent in randomly assigned approach is the same agent that the customer is assigned to in reality. Assume the total number of such enrollments is E3. Among the E3 enrollments where random assignment recommended the same agent to the customer as the ground truth, the analytic server may calculate the number of cases that the customer actually purchased a product from that agent (e.g., positive sale). Assume the number of positive sales is S3. The analytic server may calculate the model performance as S3/E3.

As shown in FIG. 6B, the random forest model may achieve 64% conversion rate, the Bayesian logistic regression model may achieve 45% conversion rate 602. The random assignment may achieve 10% conversion rate 606. Therefore, both the random forest model and the Bayesian logistic regression model discussed herein achieve better performance than the random assignment.

Figure 7A:
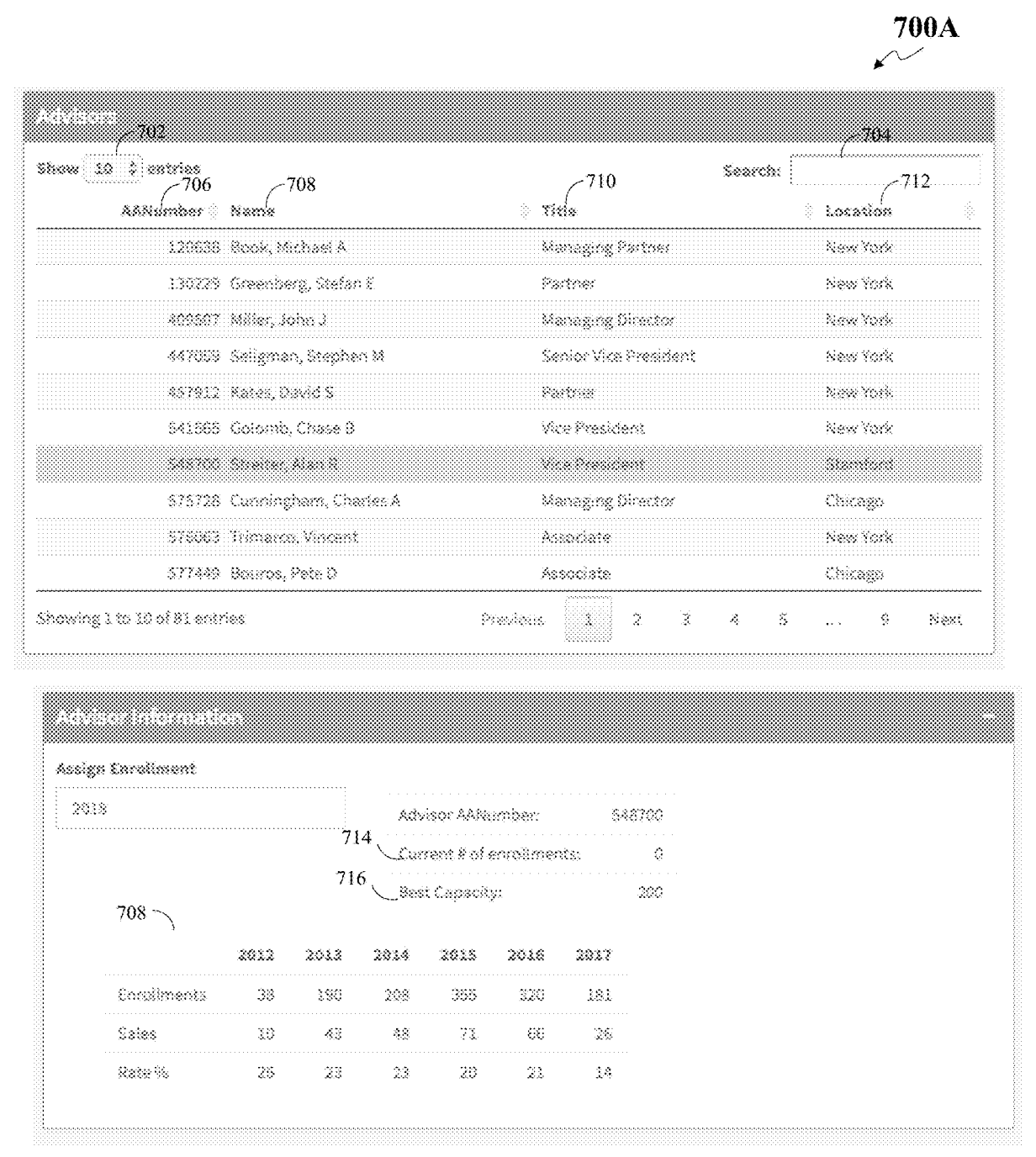

FIG. 7A illustrates an example of a graphical user interface 700A for agent lists, according to an embodiment. The agent lists may include many pages. The GUI may include a dropdown menu 702 that allows an administrative user to choose the number of entries on each page. For example, the GUI may display the first page of the list including first ten agents. For each agent, the GUI may include basic agent information, such as the agent ID number 706, name 708, title 710, and location 712. The GUI may also include an interactive interface (e.g., a text box) 704 that allows the administrative user to input keywords to search the list. When the administrative user selects one of the agents in the list, the GUI may further display detailed information on the selected agent. For example, assuming the selected agent is agent with ID number 548700, the GUI may display the number of current enrollments 714, the best capacity 716, and the historical data 718 of the agent, which may include the enrollments, sales, and conversion rate for the last five years.

Figure 7B:
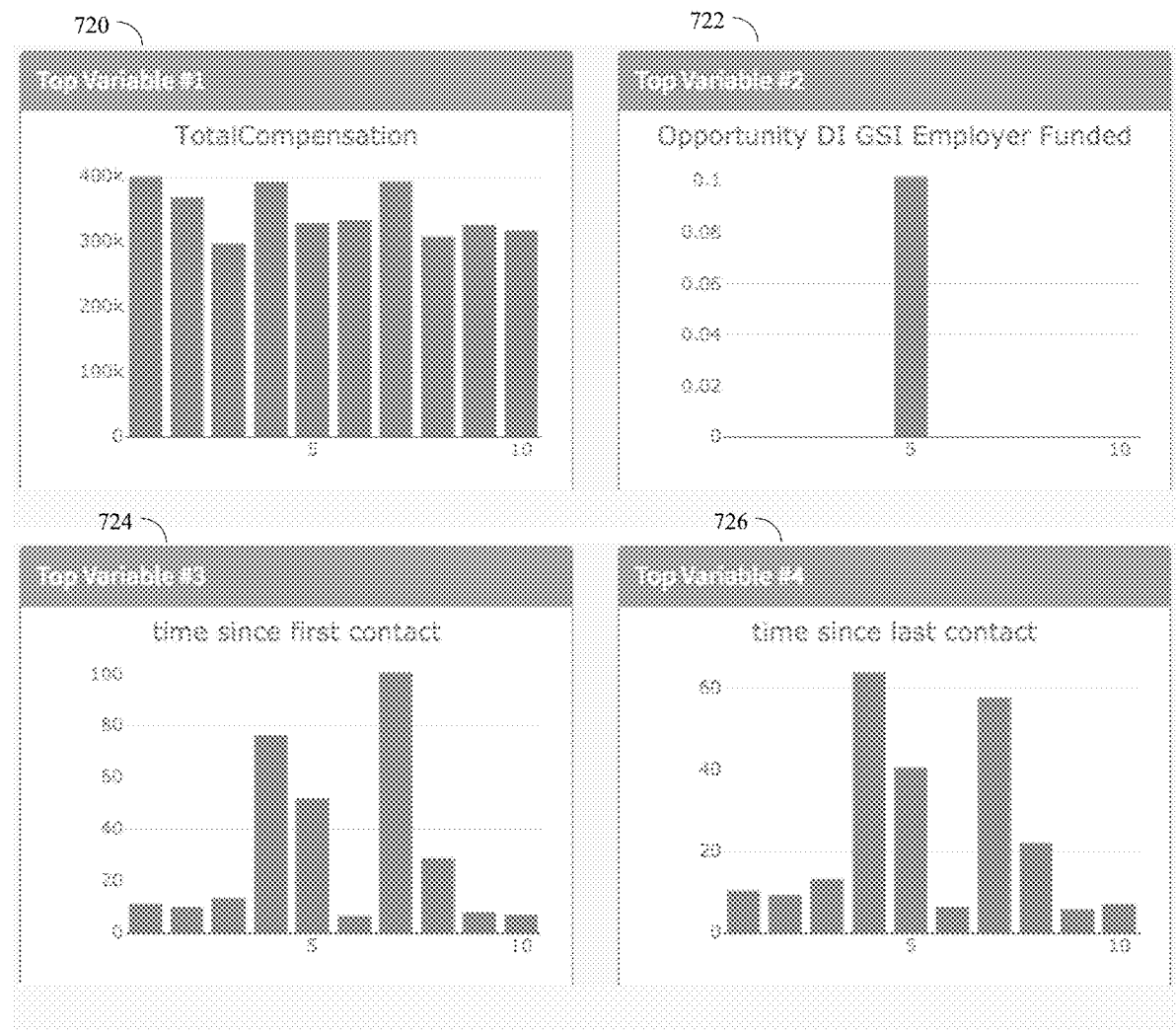
FIG. 7B illustrates an example of a graphical user interface for top variables of the agents, according to an embodiment.

FIG. 7B illustrates an example of a graphical user interface 700B for top variables of the agents, according to an embodiment. As discussed above, the GUI may display the first page of the list including ten agents. The GUI may further include the top variables of the ten agents. For example, the GUI may display a bar graph for the variable of total compensation of the ten agents 720. Furthermore, the GUI may include bar graphs for the variable of opportunity DI (disability insurance) GSI (guaranteed standard issue) employer funded 722, the variable of the time since first contact 724, the variable of time since last contact 726 of the agents.

Figure 8:
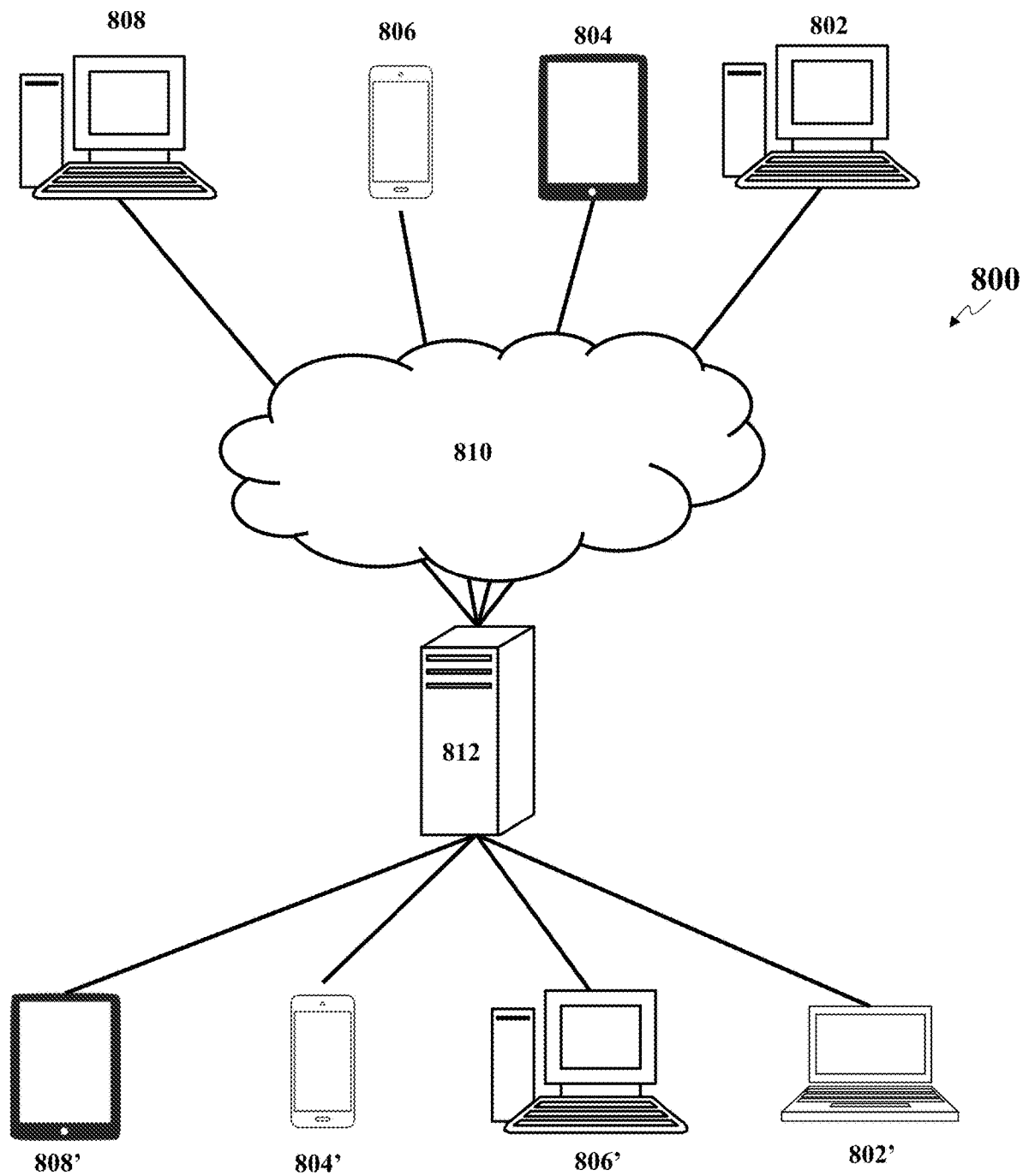
FIG. 8 illustrates an example of routing a plurality of electronic requests generated by a set of user devices to a set of agent-computing devices, according to an embodiment.

FIG. 8 illustrates an example 800 of routing a plurality of electronic requests generated by a set of user devices to a set of agent-computing devices, according to an embodiment. The analytic server 812 may receive a plurality of electronic requests from the set of electronic user devices 802, 804, 806, 808 over the network 810. The analytic server may select a target agent for each of the plurality of electronic request, and route or transmit the requests to the agent-computing device 802', 804', 806', 808' associated with the target agents. In this example, the analytic server may route the electronic request generated by the electronic user device 802 to the agent-computing device 802'. The analytic server may route the electronic request generated by the user device 804 to the agent-computing device 804'. The analytic server may route the electronic request generated by the user device 806 to the agent-computing device 806'. The analytic server may route the electronic request generated by the user device 808 to the agent-computing device 808'.

Example

In a non-limiting example, the analytic server receives ten electronic requests from customer electronic devices. The request may be received via ten different users accessing a web-application generated/operated by the analytics server. For instance, the users may execute a web browser and access a website generated by the analytic server. The electronic request may be an enrollment request for each user. For each electronic request, the analytic server determines a target agent that is highly likely to satisfy the request, such as convert the request/enrollment to a sale or satisfy an IT/technical problem. In order to route each request to the right agent, the analytic server executes an artificial intelligence model trained for each agent to determine a score. Assuming that there are five agents, the output for each request may be five scores indicating the corresponding agent's success probability. As described above, each artificial intelligence model is uniquely configured and trained based on each agent's historical data (e.g., previous satisfaction of electronic requests). The analytic server also calculates an entropy value for each request based on the scores. The analytic server sorts the ten electronic requests into a queue in an ascending order based on the entropy values. For example, if request A has the lowest entropy, the analytic server places request A in the first place in the queue and routes request A first. To route request A, the analytic server compares the five scores of the five agents to a threshold. Assuming there are three agents whose scores satisfy the threshold. The analytic server further checks the three agents' active assignments to determine if their assignments have reached their capacities. Assuming there are two agents whose capacities are not reached (e.g., do not have a full load of electronic requests assigned) and are available to accept new assignments. The analytic server chooses the agent from the remaining two agents. More specifically, the analytic server chooses the agent with the highest score as the target agent for request A. Assuming the target agent is agent X, the analytic server routes electronic request A to agent X. The analytic server also updates the number of active assignments of agent X by adding the new assignment. The analytic server then goes to the second electronic request in the queue to route the request using the process discovered above until all ten requests are all routed.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
   executing, by a server, an artificial intelligence model to generate a score for an electronic request for at least a portion of a set of users, the score being indicative of a probability of each user of the at least portion of the set of users satisfying the electronic request; and
   assigning, by the server, the electronic request to at least one user of the at least portion of the set of users in accordance with the score and a capacity value of the at least one user.
2. The method of claim 1, further comprising:
   transmitting, by the server, the electronic request to a computing device associated with the at least one user.
3. The method of claim 1, wherein the artificial intelligence model corresponds to historical data of each user of the set of users, where the artificial intelligence model is configured to determine a relationship between at least one attribute of the electronic request and the at least portion of the set of users.
4. The method of claim 1, wherein the capacity corresponds to a threshold number of electronic requests the at least one user can accept.
5. The method of claim 1, wherein the capacity corresponds to a threshold number of electronic requests the at least one user has accepted.
6. The method of claim 1, further comprising:
   directing, by the server, a first user associated with the electronic request to a webpage displaying data associated with the at least one user.
7. The method of claim 1, further comprising:
   determining, by the server, the capacity based on a historical dataset or a trend of a success ratio relative to a number of electronic requests assigned to the at least one user.
8. The method of claim 1, wherein the capacity corresponds to a number of electronic requests of a last local maxima that is above an average success ratio of the at least one user.
9. The method of claim 1, further comprising:
   generating, by the server, a queue of electronic requests for at least one user.
10. A computer system comprising:
    a memory storage having a set of non-transitory instructions that when executed cause a processor to:
    execute an artificial intelligence model to generate a score for an electronic request for at least a portion of a set of users, the score being indicative of a probability of each user of the at least portion of the set of users satisfying the electronic request; and
    assign the electronic request to at least one user of the at least portion of the set of users in accordance with the score and a capacity value of the at least one user.
11. The computer system of claim 10, wherein the instruction further cause the processor to transmit the electronic request to a computing device associated with the at least one user.
12. The computer system of claim 10, wherein the artificial intelligence model corresponds to historical data of each user of the set of users, where the artificial intelligence model is configured to determine a relationship between at least one attribute of the electronic request and the at least portion of the set of users.
13. The computer system of claim 10, wherein the capacity corresponds to a threshold number of electronic requests the at least one user can accept.
14. The computer system of claim 10, wherein the capacity corresponds to a threshold number of electronic requests the at least one user has accepted.
15. The computer system of claim 10, wherein the instructions further cause the processor to direct a first user associated with the electronic request to a webpage displaying data associated with the at least one user.
16. The computer system of claim 10, wherein the instructions further cause the processor to determine the capacity based on a historical dataset or a trend of a success ratio relative to a number of electronic requests assigned to the at least one user.
17. The computer system of claim 10, wherein the capacity corresponds to a number of electronic requests of a last local maxima that is above an average success ratio of the at least one user.
18. The computer system of claim 1, wherein the instructions further cause the processor to generate a queue of electronic requests for at least one user.
19. A computer system comprising:
    a set of computers operated by a set of users;
    a server in communication with the set of computers, the server configured to:

execute an artificial intelligence model to generate a score for an electronic request for at least a portion of the set of users, the score being indicative of a probability of each user of the at least portion of the set of users satisfying the electronic request; and assign the electronic request to at least one user of the at least portion of the set of users in accordance with the score and a capacity value of the at least one user.

20. The computer system of claim 19, wherein the server is further configured to transmit the electronic request to a computing device associated with the at least one user.

* * * * *